United States Patent
Jang et al.

(10) Patent No.: US 10,111,233 B2
(45) Date of Patent: Oct. 23, 2018

(54) METHOD AND APPARATUS FOR MEASURING CELLS OF TERMINAL INCLUDING PLURAL HETEROGENEOUS COMMUNICATION MODULES IN WIRELESS COMMUNICATION SYSTEM

(75) Inventors: Jae Hyuk Jang, Suwon-si (KR); Soeng Hun Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 120 days.

(21) Appl. No.: 13/205,866

(22) Filed: Aug. 9, 2011

(65) Prior Publication Data

US 2012/0039197 A1 Feb. 16, 2012

Related U.S. Application Data

(60) Provisional application No. 61/374,182, filed on Aug. 16, 2010.

(30) Foreign Application Priority Data

Jul. 25, 2011 (KR) .................. 10-2011-0073608

(51) Int. Cl.
*H04W 72/08* (2009.01)
*H04W 24/10* (2009.01)
(Continued)

(52) U.S. Cl.
CPC ......... *H04W 72/082* (2013.01); *H04W 24/10* (2013.01); *H04W 36/30* (2013.01);
(Continued)

(58) Field of Classification Search
CPC ... H04W 72/082; H04W 24/10; H04W 36/30; H04W 28/04; H04W 28/18; H04W 84/12;
(Continued)

(56) References Cited

U.S. PATENT DOCUMENTS 8,411,555 B2 * 4/2013 Kazmi .................. 370/208
8,670,415 B2 * 3/2014 Chang ............... H04W 36/0083
370/331

(Continued)

FOREIGN PATENT DOCUMENTS

JP 2004-207839 A 7/2004
JP 2009-60250 A 3/2009

OTHER PUBLICATIONS

Yongguang Zhang et al., "Intrusion Detection in Wireless Ad-Hoc Networks", 6th Annual International Conference on Mobile Computing and Networking (MobiCom '00), Aug. 2000, pp. 275-283, Boston, MA.

(Continued)

*Primary Examiner* — Kwang B Yao
*Assistant Examiner* — Hardikkumar Patel
(74) *Attorney, Agent, or Firm* — Jefferson IP Law, LLP

(57) ABSTRACT

A method for measuring signals of peripheral cells when heterogeneous communication modules such as Long Term Evolution (LTE), wireless Local Area Network (LAN), Bluetooth, and Global Positioning System (GPS) coexist in a terminal in a wireless communication system is provided. The method includes receiving a measuring report setting message including measuring report conditions from a base station, measuring signal quality of at least one of a serving cell or a peripheral cell and determining whether the measured signal quality satisfies the measuring report conditions, and generating and transmitting a measuring report message including a measuring result to the base station when the measured signal quality satisfies the measuring report conditions. Accordingly, the terminal may measure signals of peripheral cells in a state in which there is interference from another communication module to maintain a normal communication situation.

14 Claims, 7 Drawing Sheets

(51) Int. Cl.
*H04W 36/30* (2009.01)
*H04W 28/18* (2009.01)
*H04W 64/00* (2009.01)
*H04W 84/12* (2009.01)
*H04W 84/18* (2009.01)
*H04W 88/06* (2009.01)
*H04W 88/08* (2009.01)
*H04W 28/04* (2009.01)

(52) U.S. Cl.
CPC ............ *H04W 28/04* (2013.01); *H04W 28/18* (2013.01); *H04W 64/00* (2013.01); *H04W 84/12* (2013.01); *H04W 84/18* (2013.01); *H04W 88/06* (2013.01); *H04W 88/08* (2013.01)

(58) Field of Classification Search
CPC ..... H04W 84/18; H04W 88/06; H04W 88/08; H04W 72/0413; H04W 74/0883; H04W 74/0891; H04W 76/021; H04W 28/26; H04W 28/16; H04L 27/28; H04L 1/1854; H04L 1/1858
USPC ........................................................ 370/252
See application file for complete search history.

(56) References Cited

U.S. PATENT DOCUMENTS

| | | | | |
|---|---|---|---|---|
| 8,923,878 | B2 * | 12/2014 | Morimoto ............ | H04W 16/14 370/331 |
| 2004/0032853 | A1 * | 2/2004 | D'Amico et al. ............ | 370/349 |
| 2004/0127191 | A1 | 7/2004 | Matsunaga | |
| 2006/0127100 | A1 * | 6/2006 | Frankel et al. ............... | 398/158 |
| 2006/0146762 | A1 * | 7/2006 | Kuroda et al. ................ | 370/335 |
| 2008/0260000 | A1 * | 10/2008 | Periyalwar et al. .......... | 375/133 |
| 2008/0273497 | A1 * | 11/2008 | Lu et al. ....................... | 370/331 |
| 2009/0143095 | A1 | 6/2009 | Zhang | |
| 2009/0175178 | A1 * | 7/2009 | Yoon et al. ................... | 370/252 |
| 2009/0186614 | A1 * | 7/2009 | Aoyama et al. .............. | 455/436 |
| 2009/0296785 | A1 | 12/2009 | Wu et al. | |
| 2010/0135174 | A1 * | 6/2010 | Mori ............................ | 370/252 |
| 2010/0137025 | A1 | 6/2010 | Tal et al. | |
| 2010/0195514 | A1 * | 8/2010 | Xu et al. ....................... | 370/252 |
| 2010/0322177 | A1 * | 12/2010 | Luo et al. ..................... | 370/329 |
| 2011/0045831 | A1 * | 2/2011 | Chiu et al. .................... | 455/436 |
| 2011/0110251 | A1 * | 5/2011 | Krishnamurthy ... | H04W 72/082 370/252 |
| 2011/0243094 | A1 * | 10/2011 | Dayal ................... | H04W 16/14 370/331 |
| 2012/0020231 | A1 * | 1/2012 | Chen ..................... | H04W 36/08 370/252 |
| 2012/0147831 | A1 * | 6/2012 | Golitschek ................... | 370/329 |

OTHER PUBLICATIONS

Xu Yang et al., "Resource Management for Service Providers in Heterogeneous Wireless Networks", Wireless Communications and Networking Conference, Mar. 13-17, 2005, pp. 1305-1310, vol. 3, IEEE.

3rd Generation Partnership Project, "3rd Generation Partnership Project; Technical Specification Group Radio Access Network; Evolved Universal Terrestrial Radio Access (E-UTRA); Radio Resource Control (RRC); Protocol specification (Release 9)", Jun. 17, 2010, 3GPP TS 36.331 V9.3.0, 650 Route des Lucioles—Sophia Antipolis Valbonne—France.

Ericsson et al. "Methods for WLAN/Bluetooth in-device coexistence interference avoidance", Jun. 28-Jul. 2, 2010, 3GPP TSG-RAN WG2 #70bis, R2-103900, Stockholm, Sweden.

Technical Specification, European Telecommunications Standards Institute(ETSI), "LTE ; Evolved Universal Terrestrial Radio Access(EUTRA); User Equipment (UE) conformance specification; Radio transmission and reception; Part 3: Radio Resource Management (RRM) conformance testing (3GPP TS 36.521-3 version 9.1.0 Release 9)", Jul. 1, 2010, vol. 3GPP RAN 5, No. V9.1.0, 1, XP014047494, 650 Route des Lucioles—Sophia Antipolis Valbonne—France.

CMCC, "Addition of LTE UE RF requirements for coexistence with WLAN", Feb. 22-26 2010, 3GPP Draft; R4-100707, vol. RAN WG4, No. 20100222, XP050426101, 3rd Generation Partnership Project(3GPP), San Francisco, USA.

Alcatel-Lucent, "Transfer of UE capabilities over S1", 3rd Generation Partnership Project, Mar. 31-Apr. 3, 2008, TSG RAN WG3 #59bis, R3-080689, Shenzhen, China.

3rd Generation Partnership Project, "RRC Connection Establishment: Reject with Frequency Info set to the same frequency band—Successful case", Jun. 2010, pp. 1077-1088, 3GPP TS 34.123-1 V9.1.0.

Mediatek; "Discussion on In-device Coexistence Interference Avoidance"; 3GPP TSG-RAN WG2 Meeting #70bis; Jun. 28-Jul. 2, 2010; pp. 1-3; Stockholm, Sweden; R2-103644.

QUALCOMM; "RRM Analysis for In-device coexistence"; 3GPP TSG-RAN WG2 Meeting #70bis; Jun. 28, Jul. 2, 2010; pp. 1-3; Stockholm, Sweden; R2-103785.

CMCC; "Kickoff for SI on interference avoidance for in-device coexistence"; 3GPP TSG-RAN WG2 Meeting #70bis; Jun. 28-Jul. 2, 2010; pp. 1-4; Stockholm, Sweden; R2-103949.

\* cited by examiner

METHOD AND APPARATUS FOR MEASURING CELLS OF TERMINAL INCLUDING PLURAL HETEROGENEOUS COMMUNICATION MODULES IN WIRELESS COMMUNICATION SYSTEM

PRIORITY

This application claims the benefit under 35 U.S.C. § 119(e) of a U.S. Provisional application filed on Aug. 16, 2010 in the U.S. Patent and Trademark Office and assigned Serial No. 61/374,182, and claims the benefit under 35 U.S.C. § 119(a) of a Korean patent application filed on Aug. 8, 2011 in the Korean Intellectual Property Office and assigned Serial No. 10-2011-0078547, the entire disclosure of each of which is hereby incorporated by reference.

BACKGROUND OF THE INVENTION

1. Field of the Invention

The present invention relates to a wireless communication system. More particularly, the present invention relates to a method for measuring signals of peripheral cells when heterogeneous wireless communication modules coexist in a terminal and an apparatus thereof.

2. Description of the Related Art

In recent years, with the increasing use of smart phones, demand and use of wireless Local Area Networks (LANs), Bluetooth, and Global Positioning Systems (GPS) have rapidly increased. According to the trend, various heterogeneous communication technologies such as a conventional cellular network technology (i.e., Long Term Evolution/Universal Mobile Telecommunications System (LTE/UMTS)), wireless LAN and Bluetooth, and Global Navigation Satellite System (GNSS)/GPS frequently coexist. When the heterogeneous communication technologies are simultaneously used, there arises a mutual interference problem. With respect to the issue, In-Device Coexistence (IDC) has been discussed in the $3^{rd}$ Generation Partnership Project (3GPP) standards setting. A heterogeneous communication technology other than LTE refers to an interfering Communication Technology (CT).

For example, LTE/UMTS communication technology operates at various frequency bands, whereas a communication technology such as Bluetooth or wireless LAN operates at an Industrial, Scientific and Medical (ISM) band of 2400~2483.5 MHz. In particular, among various bands using the LTE/UMTS communication technology, because Band 4 (2300-2400 MHz) and uplink band (2500-2570 MHz) of Band 7 are adjacent to an ISM band used by the Bluetooth and the wireless LAN, when they are simultaneously used, a transmission signal in one communication technology may be treated as a received signal in another communication technology which causes strong interference.

In the meantime, for a general report with respect to signal quality, when signal qualities of peripheral cells are better than that of a cell (referred to as 'serving cell' hereinafter) with which a terminal is communicating, the terminal reports this condition to the cell. However, when signals of peripheral cells are simultaneously deteriorated, the terminal does not report measured information to the cell. When such a situation occurs, it is difficult for the terminal to communicate with the cell and cannot receive other processes (e.g., handover command to another cell, etc.). Therefore, a need exists for an improved apparatus and method for measuring signals of peripheral cells when heterogeneous wireless communication modules coexist in a terminal.

SUMMARY OF THE INVENTION

Aspects of the present invention are to address at least the above-mentioned problems and/or disadvantages and to provide at least the advantages described below. Accordingly, an aspect of the present invention is to provide a method for reporting measured information to a cell in an interference situation when heterogeneous communication modules (e.g., Long Term Evolution (LTE) and Wireless-Fidelity (Wi-Fi), LTE and Bluetooth, or LTE and Global Positioning System (GPS), etc.) exist in a terminal, and an apparatus thereof.

Another aspect of the present invention is to provide a terminal for controlling a condition starting a measuring report in a cell or a base station as follows.

If a channel situation in all cells in a band is less than a certain reference value or an instantaneous measuring value is less than an average measuring value by greater than a preset threshold, the terminal starts a measuring report.

In another measuring approach, a good measuring result (or measured value when an interfering Communication Technology (CT) is silent) and a bad measuring result (measured value when the interfering CT is busy) are separately managed to start a report according to the good measuring result or the bad measuring result.

When the measuring report is generated, at least one of a cause of starting of a measuring report, a measurement object, a measuring result of searched cells, and a measured result (instantaneous measured value) of a cell starting the measuring report may be included.

In accordance with an aspect of the present invention, a method for measuring cells of a terminal in a wireless communication system is provided. The method includes receiving a measuring report setting message including measuring report conditions from a base station, measuring signal quality of at least one of a serving cell or a peripheral cell and determining whether the measured signal quality satisfies the measuring report conditions, and generating and transmitting a measuring report message including a measuring result to the base station when the measured signal quality satisfies the measuring report conditions.

In accordance with another aspect of the present invention, a terminal measuring and reporting cells in a wireless communication system is provided. The terminal includes a transceiver for exchanging signals with a base station, and a controller for receiving a measuring report setting message including measuring report conditions from the base station, for measuring signal quality of at least one of a serving cell or a peripheral cell to determine whether the measured signal quality satisfies the measuring report conditions, and for generating and transmitting a measuring report message including a measured result to the base station when the measured signal quality satisfies the measuring report conditions.

When using a method for measuring cells according to exemplary embodiments of the present invention, a terminal reports a channel situation of a frequency band having strong interference to the cells. Accordingly, the terminal may receive a suitable process (e.g., handover to a cell of another frequency band) in an interference situation to smoothly communicate with.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For convenience of a description, it is apparent that a cellular communication (or mobile communication) technology of the present invention is explained based on a Long Term Evolution (LTE) system but the present invention is applicable to any cellular communication technology.

Figure 1:
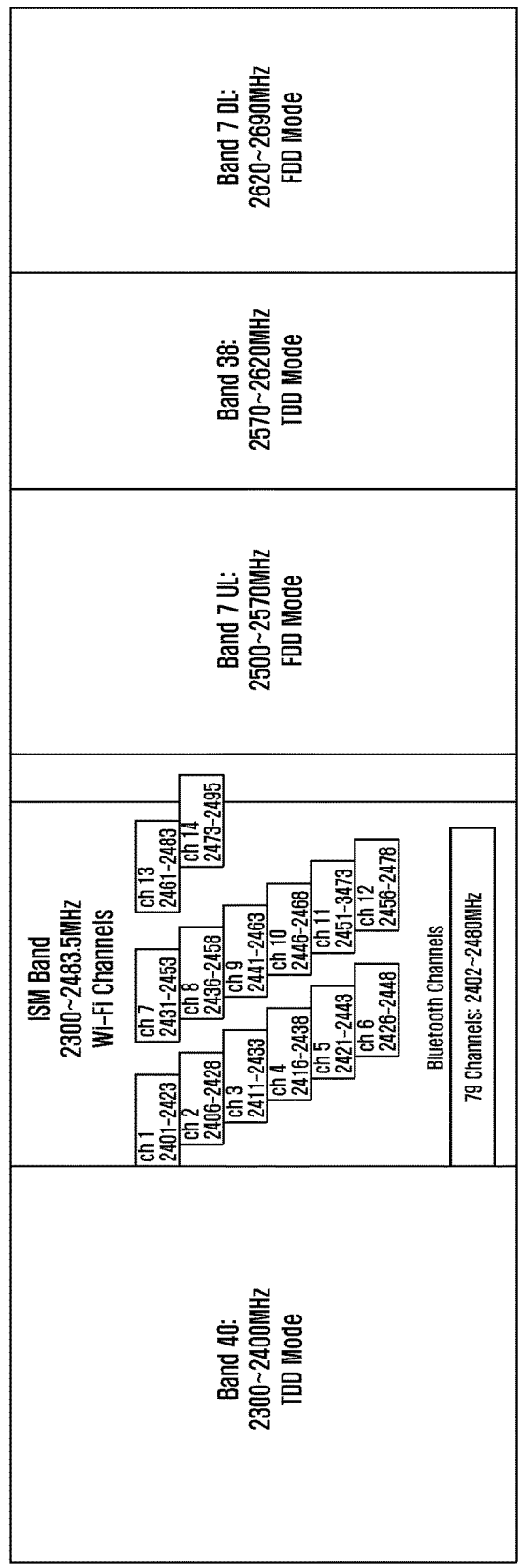
FIG. 1 is a view illustrating a frequency band adjacent to an Industrial Scientific and Medical (ISM) band among frequency bands used for mobile communication in a current $3^{rd}$ Generation Partnership Project (3GPP) according to an exemplary embodiment of the present invention.

FIG. 1 is a view illustrating a frequency band adjacent to an Industrial Scientific and Medical (ISM) band among frequency bands used for mobile communication in a current $3^{rd}$ Generation Partnership Project (3GPP) according to an exemplary embodiment of the present invention.

Referring to FIG. 1, where a mobile communication cell uses Band 40, and a wireless LAN uses a channel number 1, it is appreciated that interference is strong because the frequencies are very close to each other. Similarly, where the mobile communication cell uses Band 7, and a wireless LAN uses a channel number 13 or 14, it is appreciated that interference is strong.

In this case, the terminal should operate at a 'preference band' having weak interference phenomenon. However, if the terminal operates at a 'non-preference band' having strong interference phenomenon, each time interfering Communication Technology (CT) operates, received signals from a currently operated cell and peripheral cells are degraded. If the interfering CT frequently transmits signals, received signals of all cells operating at a frequency adjacent to a frequency band used by the interfering CT are degraded. In this case, it is preferred that the cell instructs handover to a cell using another frequency band such that a current terminal operates at another used frequency band.

However, since the terminal does not report measuring information to a cell when signals of all peripheral cells are simultaneously deteriorated, there is a need to address this problem.

Hereinafter, an exemplary terminal of the present invention may include heterogeneous communication modules, namely, a first communication module performing wireless communication with a cellular network and a second communication module performing near or long distance wireless communication with a network other than the cellular network or an access point. In this case, the first communication module may be a cellular communication module using a mobile base station. The second communication module may include at least one of a wireless Local Area Network (LAN) module (such as a Wireless-Fidelity (Wi-Fi) module), a Bluetooth module, or a Global Positioning System (GPS) performing communication that may interfere with the cellular communication module (e.g., LTE communication module) of a terminal.

Figure 2:
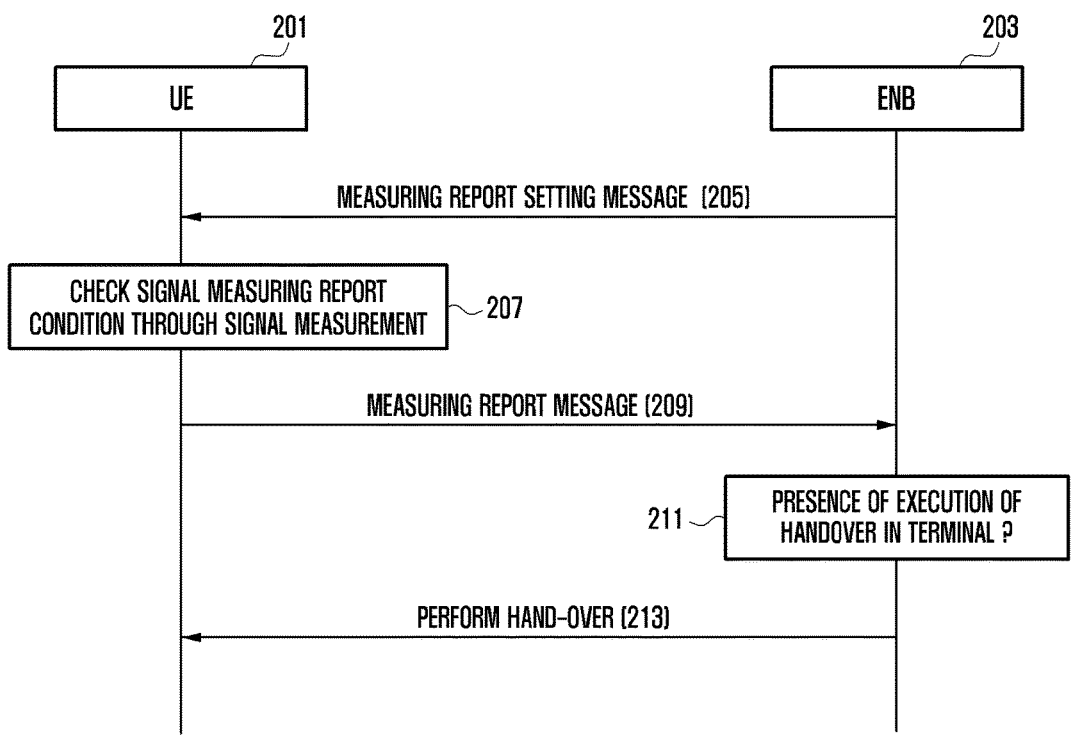
FIG. 2 is a diagram illustrating message flow with respect to a signal measuring report procedure according to an exemplary embodiment of the present invention.

FIG. 2 is a diagram illustrating message flow with respect to a signal measuring report procedure according to an exemplary embodiment of the present invention.

Referring to FIG. 2, operations of a terminal (e.g., a User Equipment (UE)) 201 and a cell (or base station, e.g., an evolved Node B (eNB)) 203 will be described. The cell 203 transmits a measuring report setting message to inform of cell measuring conditions, condition information with respect to a measuring report, and parameters with respect to respective conditions in step 205.

The measuring report setting message is a Radio Resource Control (RRC) message. In the condition, one or plural conditions may be selectively set. For example, a plurality of conditions may be set. When one or all of a plurality of conditions are satisfied, the condition may be set.

An exemplary embodiment of the present invention suggests that for condition information about the measuring report, a signal measuring report starts in conditions as follows.

[Condition 1]

Average signal quality from all cells in one frequency band becomes worse than a preset 'first threshold' (namely, less than a first threshold), that is, when average signal quality from cell 1 to cell N operating at a band A is $Q_{avg-A1}$, $Q_{avg-A2}, \ldots, Q_{avg-AN}$, $Q_{avg-A1}$<threshold 1, $Q_{avg-A2}$<threshold 1, ..., $Q_{avg-AN}$<threshold 1.

[Condition 2]

Instantaneous signal quality from one cell of one frequency band is deteriorated to a level below an average signal quality of a corresponding cell by greater than a 'second threshold', that is, when average signal quality of a cell S in which a terminal is now operating is $Q_{avg-S}$, and an instantaneous signal quality of a cell X, being one of peripheral cells, is $Q_{inst-X}$, $Q_{avg-S}-Q_{inst-X}$>threshold 2.

[Condition 3]

A bad signal quality average value of a predetermined cell (e.g., serving cell) of one frequency band is less than a preset reference value Using the measuring condition information received in step 205 from the cell 203, the terminal 201 measures a signal. The terminal 201 determines whether a signal measuring report condition set from the cell 203 is satisfied through signal measurement in step 207. If the measuring report condition is satisfied, the terminal 201 transmits a measuring report message including measuring report information to the cell 203 in step 209. The measuring report message is an RRC message. The measuring report information may include at least one of the following parameters. A cause of starting of a measuring report (namely, a type of an event starting the measuring report):

Measurement object (e.g., measured frequency band)

Average signal quality of respective cells and/or average signal quality of respective serving cells (received in one frequency band)

Good signal quality average and a bad signal quality average of a serving cell (described below)

Instantaneous signal quality of a certain cell starting a measuring report (corresponding to condition 2)

A cause of starting of the measuring report and a measurement object may be expressed as information called a measurement ID. The cell 203 sets measurement to the terminal 201, associates the measurement ID, the report configuration, and the measurement object with each other. Next, the terminal 201 may add the cause of starting of the measuring report and the measurement ID corresponding to the measurement object to a control message upon reporting measurement to omit information associated with the measurement object and the report configuration.

Meanwhile, the cell 203 receives a measuring report message including the foregoing measuring report information in step 209. Accordingly, the cell 203 determines whether the terminal 201 performs handover based on the received measuring report information in step 211. If it is determined that the handover is required, the cell 203 performs handover to address an interference problem occurring from an In-Device Coexistence (IDC) in step 213.

In the meantime, when interfering CT performed by a second communication module of the terminal 201 generates an interference signal, it may be discovered that signal quality is rapidly deteriorated and then rapidly improved. That is, signal quality measured by the terminal 201 shows a difference according to the presence of transmission of the interfering CT. However, in general, since the measuring result is obtained by using a weighted moving average, it is difficult to reflect a rapid change of a channel.

Accordingly, a case of step 207 in FIG. 2 of measuring the signal by the terminal 201 requires a method capable of more exactly measuring the signal quality. This will be described with reference to FIG. 3.

Figure 3:
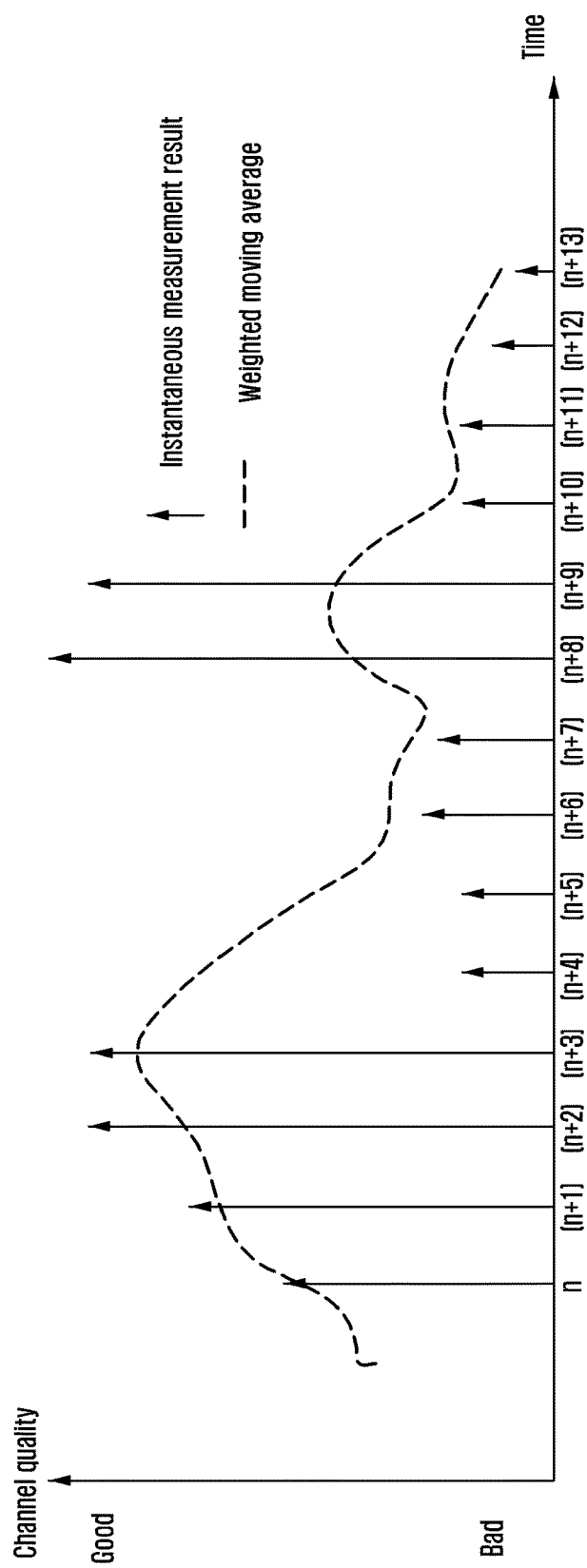
FIG. 3 is a graph comparing an instantaneous measuring result with a weighted moving average value when a channel rapidly changes according to an exemplary embodiment of the present invention.

FIG. 3 is a graph comparing an instantaneous measuring result with a weighted moving average value when a channel rapidly changes according to an exemplary embodiment of the present invention.

Referring to FIG. 3, interfering CT device performs transmission during a time interval from n+4 to n+7 and a time interval from n+10 to n+13. For example, it may be assumed that a Bluetooth module operates during the foregoing time intervals.

In FIG. 3, instantaneous signal quality during a time interval from n+4 to n+7 and from n+10 to n+13 is very low. However, because the weighted moving average is an average including a previous value in which a channel situation was good, it cannot reflect real instantaneous signal quality.

To reflect the real channel quality in the foregoing state, exemplary embodiments of the present invention separately manage a good measuring result and a bad measuring result of a signal.

[Measured Result 1]

The terminal 201 determines a weighted moving average of values of relative excellent time intervals of the signal. That is, the measuring result 1 is a value measuring a time interval in which interfering CT is not performed.

The measured result 1 is determined by Equation 1.

$$F1_n = (1-a1)*F1_{n-1} + a1*M1_n \qquad \text{Equation 1}$$

where, $M1_n$ is the latest instantaneous measured value taken from time interval/sub-frame (referred to as 'sub-frame 1' hereinafter) in which interfering CT does not transmit (or to which interfering CT does not cause interference or having measured excellent signal quality), which is n, n+1, n+2, n+3, n+8, n+9 in FIG. 3. $F1_n$ is a weighted moving average obtained from $M1_n$ and a weighted moving average $F1_{n-1}$ just before the latest time taken in a time interval to which interfering CT does not transmit (or to which interfering CT does not cause interference or having measured excellent signal quality). The $a1 = \frac{1}{2}^{(k1/4)}$, and k1 is a filter coefficient in corresponding measurement received from step 205.

[Measured Result 2]

The terminal 201 determines a weighted moving average of values during a relative bad time interval of a signal. That is, the measuring result 2 is a value measuring a time interval in which an interfering CT is not performed.

The measuring result 2 is determined by Equation 2.

$$F2_n = (1-a2)*F2_{n-1} + a2*M2_n \qquad \text{Equation 2}$$

where, $M2_n$ is the latest instantaneous measured value taken from a time interval/sub-frame (referred to as 'sub-frame 2') that an interfering CT device transmits (or interfering CT interferes or having measured bad signal quality), which is n+4, n+5, n+6, n+7, n+10, n+11, n+12, or n+13. $F2_n$ is a weighted moving average obtained from $M2_n$ and a weighted moving average $F2_{n-1}$ to just before the latest time taken in a time interval that the interfering CT device transmits (or interfering CT interferes or having measured bad signal quality). $A2 = \frac{1}{2}^{(k2/4)}$, and k2 is a filter coefficient in corresponding measurement received from step 205.

The definition determines which sub-frame is a sub-frame 1 or a sub-frame 2, namely whether a second communication module is driving in a following approach.

[Approach 1]

An upper layer informs whether an interfering CT device is transmitting a signal. An RRC may notify a time interval to which the interfering CT does not occur as a sub-frame 1, and a time interval to which the interfering CT occurs as a sub-frame 2.

[Approach 2]

The RRC classifies sub-frames having relatively good/bad signal qualities from sub-frames. The RRC may notify sub-frames having signal quality better than that of adjacent sub-frames among sub-frames as a sub-frame 1, and sub-frames having signal quality worse than that of the adjacent sub-frames among sub-frames as a sub-frame 2 to the terminal 201.

At this time, a classifying method is to compare a measuring result of one sub-frame with a weighted instantaneous average to the sub-frame. For example, assuming that $M_n$ is a measuring result in an n sub-frame, a weighted moving average of a sub-frame 1 to an (n−1)th sub-frame is $F1_{n-1}$, and a weighted moving average of a sub-frame 2 to the (n−1)th sub-frame is $F2_{n-1}$, when $F1_{n-1}$+threshold 1>$M_n$>$F1_{n-1}$−threshold 1, an n-th sub-frame is classified as a sub-frame 1. When $F2_{n-1}$+threshold 2>$M_n$>$F2_{n-1}$−threshold 2, the n-th sub-frame is classified as a sub-frame 2.

When a measuring report starts by the condition 1, the condition 2, or the condition 3, the terminal 201 transmits $F1_n$, $F2_n$, and $F_n$ obtained by determining a weighed moving average of all measured values regardless of F1 and F2 groups to the cell 203. Additionally, the terminal 201 may also report a time rate of the sub-frame 1 and the sub-frame 2. For example, if the sub-frame 1 occupies 40% and the sub-frame 2 occupies 60% among a total time period, the terminal 201 reports the information together with a measuring report message such that the cell 203 can determine the level of interference.

Upon receiving the $F1_n$, the $F2_n$, and the $F_n$, the cell 203 checks $F1_n$. When the $F1_n$ is sufficiently great, the cell 203 may determine that performing handover to the same frequency is not required in step 211 of FIG. 2.

Meanwhile, the cell 203 may determine a channel degradation degree caused in a corresponding terminal 201 from interfering CT using the $F2_n$ and the $F_n$. If there is a great difference between the $F1_n$ and the $F2_n$, the cell 203 may recognize that channel degradation from the interfering CT is strong. In this case, the cell 203 causes a Radio Resource Management (RRM) to perform an additional operation (e.g., handover to a cell using another frequency band).

If there is a great difference between the $F1_n$ and the $F_n$, it may be recognized that a degraded time of channel quality is long because a transmission time of the interfering CT is long. In this case, the cell 203 causes the RRM to perform an additional operation (e.g., handover to a cell using another frequency band, use of Discontinuous Reception (DRX) having a long time period, etc.).

Figure 4A:
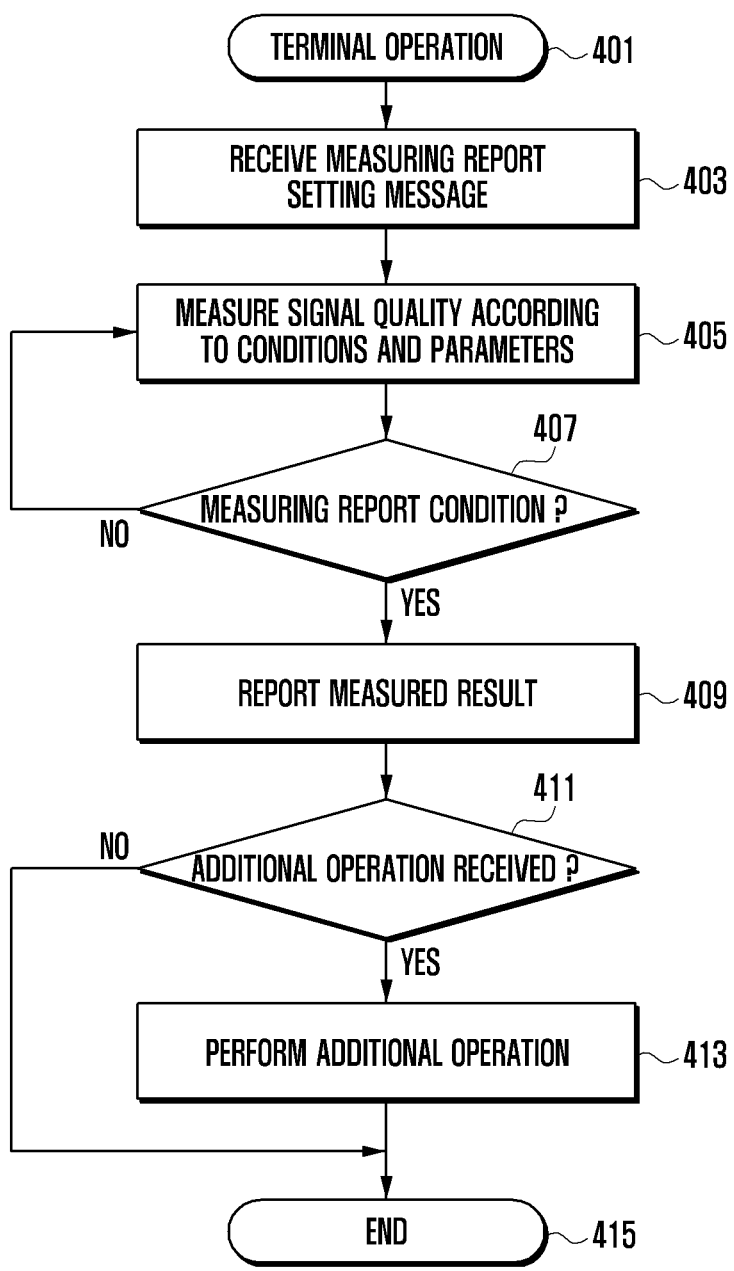
FIG. 4A is a flowchart illustrating an operation of a terminal according to an exemplary embodiment of the present invention.

FIG. 4A is a flowchart illustrating an operation of a terminal according to an exemplary embodiment of the present invention.

Referring to FIG. 4A, a terminal 201 operates in step 401.

The terminal 201 receives a measuring report setting message from a cell 203 in step 403. The measuring report setting message contains measuring report conditions, parameters used at a measurement time and information to be reported at a measuring report time. Here, the measuring report conditions may include at least one of a condition when an average signal quality from all cells of an optional frequency band is less than a first threshold, a condition when instantaneous signal quality from one cell of an optional frequency band is worse than average signal quality of a certain cell by greater than a second threshold, or a condition when an average of a bad signal quality of an optional cell having an optional frequency band is less than a preset reference value.

Next, the terminal 201 measures signal quality of a serving cell and peripheral cells according to conditions, parameters, and information set by the cell 203 through the measuring report setting message in step 405.

Subsequently, the terminal 201 determines whether a measuring result of the cell 203 agrees with a set measuring report condition in step 407. When the measuring result of the cell 203 agrees with the set measuring report condition, the terminal 201 transmits information that the cell 203 instructs to report through a measuring report message being an RRC message in step 409. In this case, the measuring report message may include at least one of a cause of starting of a measuring report, a measurement object, average signal quality of respective cells or a serving cell received in an optional frequency band, a good signal quality average and a bad signal quality average of the serving cell, or an instantaneous signal quality of a certain cell starting a measuring report.

Subsequently, the terminal 201 determines whether an additional operation (e.g., handover or DRX operation) is received from the cell 203 in step 411. When receiving the additional operation, the terminal 201 performs an operation that the cell 203 instructs in step 413. In step 415, the terminal 201 ends the procedure.

Figure 4B:
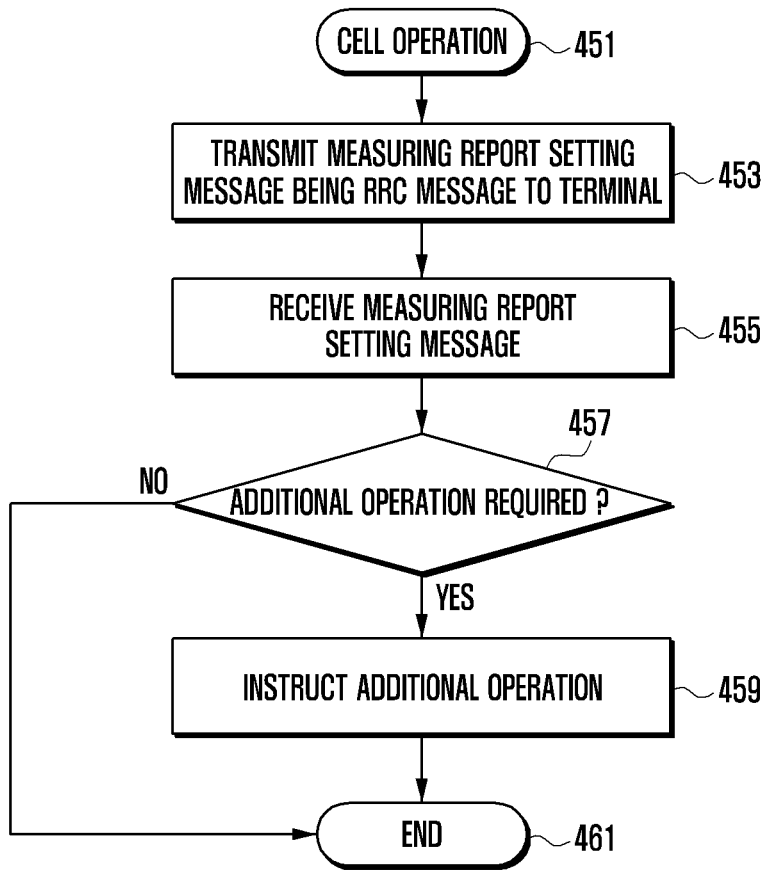
FIG. 4B is a flowchart illustrating an operation of a cell according to an exemplary embodiment of the present invention.

FIG. 4B is a flowchart illustrating an operation of a cell according to an exemplary embodiment of the present invention.

Referring to FIG. 4B, the cell 203 performs a cell operation in step 451. In step 453, the cell 203 transmits a measuring report setting message being an RRC message to a terminal 201. The measuring report setting message contains measuring report conditions, parameters used at a measurement time and information to be reported at a measuring report time.

The cell 203 receives the measuring report setting message from the terminal 201 in step 455. Accordingly, the cell 203 determines whether an additional operation, for example, handover is required based on various reported information (with respect to the foregoing description with respect to what information is included) in step 457. When it is determined that the additional operation is required, the cell 203 instructs an additional operation to the terminal 201 in step 459. When it is determined that the additional operation is not required in step 457, or after the cell 203 instructs the additional operation to the terminal 201 in step 459, the cell 203 end the procedure in step 461.

Figure 5:
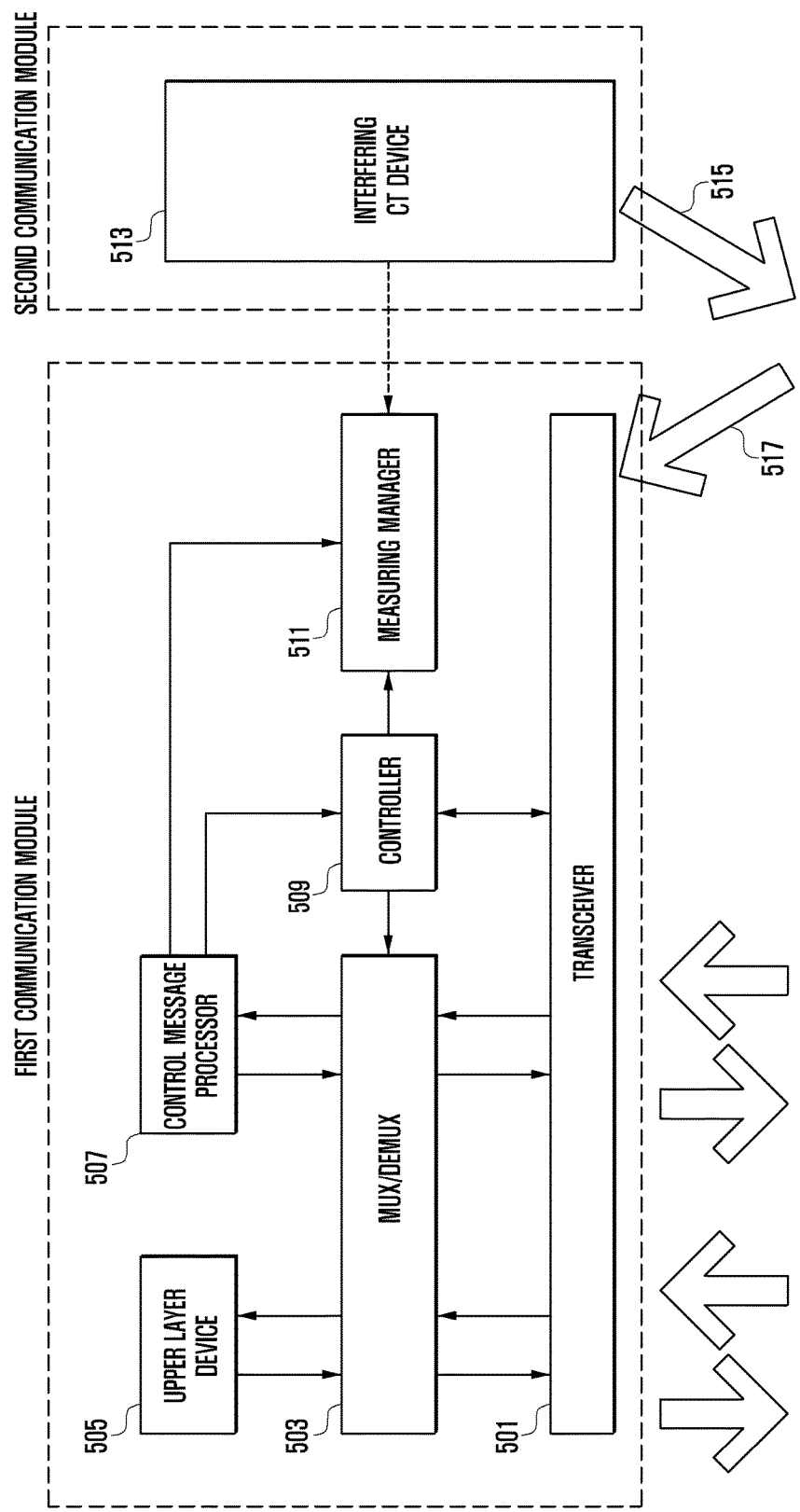
FIG. 5 is a block diagram illustrating an internal configuration of a terminal according to an exemplary embodiment of the present invention.

FIG. 5 is a block diagram illustrating an internal configuration of a terminal according to an exemplary embodiment of the present invention.

Referring to FIG. 5, a terminal 201 may include a first communication module and a second communication module. The first communication module is a module for performing cellular communication using a mobile base station. The second communication module may include at least one of a Wi-Fi module, a Bluetooth module, or a GPS module that may interfere with cellular communication (e.g., LTE communication) of the terminal 201. As shown in FIG. 5, the second communication module may refer to an interfering CT device 513.

The terminal 201 exchanges data with an upper layer device 505, and transmits and receives control messages through a control message processor 507. Upon transmission, the terminal 201 multiplexes data by a multiplexer/demultiplexer 503 and transmits the multiplexed data through a transceiver 501 under the control of a controller 509.

Conversely, upon reception, the terminal 201 receives a physical signal by the transceiver 501 under the control of the controller 509, demultiplexes the received physical signal by the multiplexer/demultiplexer 503, and transfers the demultiplexed signal to the upper layer device 505 or the control message processor 507.

In an exemplary embodiment of the present invention, a measuring manager 511 receives and stores a measuring report setting message from the control message processor 507 containing a measuring condition report and parameters received from a cell. Further, the measuring manager 511 instructs the controller 509 to measure a signal according to a stored value and receive the measured signal.

Upon measurement, to determine a sub-frame 1 or a sub-frame 2, the measuring manager 511 may directly receive a signal from an interfering CT device 513. That is, when the interfering CT device 513 performs an interfering CT operation such as wireless LAN, Bluetooth, or GPS, it may directly inform the measuring manager 511 that the interfering CT device 513 is performing interfering CT.

Conversely, when the interfering CT device 513 cannot directly inform of the presence of an interfering CT operation through the foregoing procedure, it determines whether a report of a measured result is required using a measured signal value received from the controller 509. When a measuring report condition set by the base station 203 is satisfied, the measuring manager 511 instructs the control message processor 507 to generate and transmit a measuring report message to the base station 203.

In the meantime, FIG. 5 shows the controller 509 and the measuring manger 511 as separate blocks. However, this is merely an example of an exemplary implementation and the invention is not limited to this configuration. For example, the controller 509 may perform a function performed by the measuring manager 511.

Figure 6:
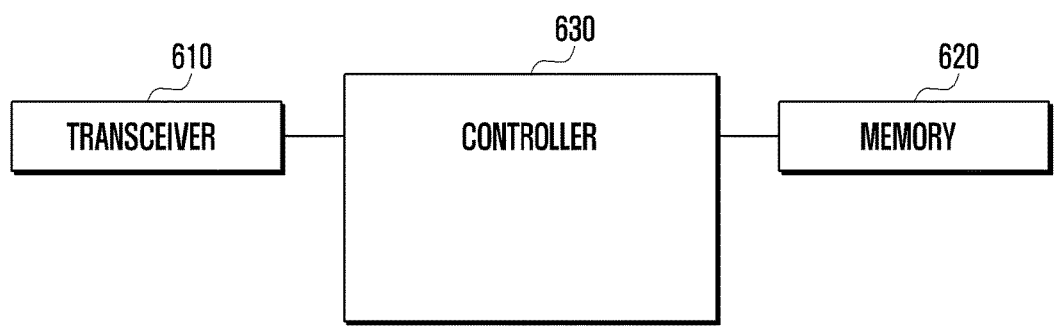
FIG. 6 is a block diagram illustrating an internal configuration of a base station according to an exemplary embodiment of the present invention.

FIG. 6 is a block diagram illustrating an internal configuration of a base station according to an exemplary embodiment of the present invention.

Referring to FIG. 6, a base station 203 of the present invention may include a transceiver 610, a memory 620, and a controller 630.

The transceiver 610 performs transmission and reception of signals, data, and messages between a base station and a terminal or between the base station and a cellular network node. To do this, the transceiver 610 may include a wired or wireless interface.

The memory 620 may store programs necessary to operate the base station 203 according to exemplary embodiments of the present invention. In an exemplary embodiment of the present invention, the memory 620 may store measured signal quality result information included in a measuring report message provided from a terminal. The base station 203 may determine an operation such as handover of a terminal using the stored information.

The controller 630 controls an overall operation of the base station 203. The controller 630 transmits a measuring report setting message being an RRC message to the terminal. The measuring report setting message contains measuring report conditions, parameters used at a measurement time and information to be reported at a measuring report time. Further, the controller 630 senses that a measuring report message is received from the terminal, and determines whether an additional operation, for example handover is required based on various reported information. When it is determined that the additional operation is required, the controller 630 instructs the terminal to perform the additional operation.

The foregoing approaches avoid interference from a current interference situation or potential interference factors to minimize interference, such that the terminal may communicate with a cellular network.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for controlling an interference by a terminal in a wireless communication system, the terminal including a first communication module for a first communication technology and a second communication module for a second communication technology, the method comprising:
   receiving, from a base station, a radio resource control (RRC) message including first information that indicates to transmit second information for reporting an interference which is detected based on a signal received by the first communication module included in the terminal and a signal coming from the second communication module included in the terminal;
   measuring a first signal quality in a first subframe in which the second communication module is not operating and a second signal quality in a second subframe in which the second communication module is operating;
   detecting the interference occurring between the first communication module and the second communication module based on the first information;
   generating the second information including a frequency band suffering from the interference;
   transmitting, to the base station, the second information for reporting the interference using the RRC signaling when a difference between a first signal quality and the second signal quality is equal to or greater than a threshold; and
   receiving, from the base station, third information that commands a handover,
   wherein the frequency band includes at least one carrier related to the first communication module, and
   wherein the second subframe is indicated from an RRC layer of the terminal.

2. The method of claim 1, wherein the interference includes an in-device coexistence (IDC) interference.

3. The method of claim 1, wherein the first information includes an indication indicating whether the terminal is configured to report the interference.

4. The method of claim 1, further comprising performing the handover to avoid the interference when the third information is received.

5. A terminal for controlling an interference in a wireless communication system, the terminal comprising:
   a first communication module configured to use a first communication technology;
   a second communication module configured to use a second communication technology; and
   a controller configured to:
      control the first communication module to receive, from a base station, a radio resource control (RRC) message including first information that indicates to transmit second information for reporting an interference which is detected based on a signal received by the first communication module included in the terminal and a signal coming from the second communication module included in the terminal, measure a first signal quality in a first subframe in which the second communication module is not operating and a second signal quality in a second subframe in which the second communication module is operating, detect the interference occurring between the first communication module and the second communication module based on the first information, generate the second information including a frequency band suffering from the interference, control the first communication module to transmit the second information for reporting the interference using the RRC signaling to the base station when a difference between a first signal quality and the second signal quality is equal to or greater than a threshold, and control the first communication module to receive third information that commands a handover from the base station, wherein the frequency band includes at least one carrier related to the first communication module, and wherein the second subframe is indicated from an RRC layer of the terminal.

6. The terminal of claim 5, wherein the interference includes an in-device coexistence (IDC) interference.

7. The terminal of claim 5, wherein the first information includes an indication indicating whether the terminal is configured to report the interference.

8. The terminal of claim 5, wherein the controller is further configured to control the first communication module to perform the handover to avoid the interference when the third information is received.

9. A method for controlling an interference by a base station in a wireless communication system, the method comprising:

transmitting, to a terminal including a first communication module for a first communication technology and a second communication module for a second communication technology, a radio resource control (RRC) message including first information that indicates to transmit second information for reporting an interference which is detected based on a signal received by the first communication module included in the terminal and a signal coming from the second communication module included in the terminal;

receiving, from the terminal, the second information for avoiding the interference occurring between the first communication module and the second communication module, the second information including a frequency band suffering from the interference;

determining whether to apply a handover procedure for the terminal based on the second information; and transmitting, to the terminal, third information that commands a handover when applying the handover procedure for the terminal is determined, wherein the frequency band includes at least one carrier related to the first communication module, wherein the second information is transmitted from the terminal, when a difference between a first signal quality measured in a first subframe in which the second communication module is not operating and a second signal quality measured in a second subframe in which the second communication module is operating is equal to or greater than a threshold, and wherein the second subframe is indicated from an RRC layer of the terminal.

10. The method of claim 9, wherein the interference includes an in-device coexistence (IDC) interference.

11. The method of claim 9, wherein the first information includes an indication indicating whether the terminal is configured to report the interference.

12. A base station for controlling an interference in a wireless communication system, the base station comprising:

a transceiver configured to transmit and receive a signal; and a controller configured to:

control the transceiver to transmit a radio resource control (RRC) message including first information, to a terminal including a first communication module for a first communication technology and a second communication module for a second communication technology, that indicates to transmit second information for reporting an interference which is detected based on a signal received by the first communication module included in the terminal and a signal coming from the second communication module included in the terminal, control the transceiver to receive, from the terminal, the second information for avoiding the interference occurring between the first communication module and the second communication module, the second information including a frequency band suffering from the interference, determine whether to apply a handover procedure for the terminal based on the second information, and control the transceiver to transmit third information that commands a handover to the terminal when applying the handover procedure for the terminal is determined, wherein the frequency band includes at least one carrier related to the first communication module, wherein the second information is transmitted from the terminal, if-when a difference between a first signal quality measured in a first subframe in which the second communication module is not operating and a second signal quality measured in a second subframe in which the second communication module is operating is equal to or greater than a threshold, and wherein the second subframe is indicated from an RRC layer of the terminal.

13. The base station of claim 12, wherein the interference includes an in-device coexistence (IDC) interference.

14. The base station of claim 12, wherein the first information includes an indication indicating whether the terminal is configured to report the interference.

* * * * *